(12) United States Patent
Rosner (10) Patent No.: US 7,207,796 B2
(45) Date of Patent: Apr. 24, 2007

(54) HOT RUNNER COINJECTION NOZZLE WITH THERMALLY SEPARATED MELT CHANNELS

(75) Inventor: Raymond J. Rosner, Winooski, VT (US)

(73) Assignee: Husky Injection Moldiing Systems Ltd. (CA)

( * ) Notice: Subject to any disclaimer, the term of this patent is extended or adjusted under 35 U.S.C. 154(b) by 220 days.

(21) Appl. No.: 10/880,494

(22) Filed: Jul. 1, 2004

(65) Prior Publication Data

US 2006/0003041 A1    Jan. 5, 2006

(51) Int. Cl.
*B29C 45/20* (2006.01)
(52) U.S. Cl. .................. 425/569; 425/130; 425/549; 425/573
(58) Field of Classification Search ............... 425/547, 425/130, 557, 560, 561, 568, 569, 549, 573
See application file for complete search history.

(56) References Cited

U.S. PATENT DOCUMENTS

| | | | |
|---|---|---|---|
| 4,717,324 A | 1/1988 | Schad et al. ............... 425/130 |
| 5,030,077 A | 7/1991 | Orimoto et al. ............ 425/130 |
| 5,135,377 A * | 8/1992 | Gellert ....................... 425/130 |
| 5,897,822 A | 4/1999 | van Manen et al. ........ 264/255 |
| 5,935,615 A | 8/1999 | Gellert et al. ............... 425/130 |
| 5,972,258 A * | 10/1999 | Sicilia ........................ 264/45.1 |
| 6,135,751 A * | 10/2000 | Gellert et al. ............... 425/130 |
| 6,261,075 B1 | 7/2001 | Lee et al. .................... 425/130 |
| 6,575,729 B2 | 6/2003 | Godwin et al. | |
| 6,739,863 B2 | 5/2004 | Olaru | |

* cited by examiner

*Primary Examiner*—Yogendra N. Gupta
*Assistant Examiner*—Emmanuel S. Luk
(74) *Attorney, Agent, or Firm*—Katten Muchin Rosenman LLP (57) ABSTRACT

Coinjection molding nozzle apparatus and method includes structure and/or steps whereby a first nozzle melt channel is kept thermally separated from a second nozzle melt channel. Preferably, grooves in the nozzle body or a separate nozzle pipe keep the first and second nozzle melt channels thermally separated. Preferably, a highly thermally conductive nozzle tip is removably coupled to the nozzle body and includes first and second nozzle tip melt channels that merge together before the mold gate.

27 Claims, 4 Drawing Sheets

HOT RUNNER COINJECTION NOZZLE WITH THERMALLY SEPARATED MELT CHANNELS

BACKGROUND OF THE INVENTION

1. Field of the Invention

The present invention relates to a coinjection nozzle having thermally separated melt channels, typically used in the hot runner system of an injection molding machine.

2. Description of Related Art

Coinjection molding is typically used to mold multi-layered plastic packaging articles having a laminated wall structure. Each layer is typically passed through a different annular or circular passageway in a single nozzle structure and each layer is partially, sequentially, injected through the same mold gate. In such multi-material molding applications, melts (often plastic resins) with different operating temperature requirements flow through a coinjection nozzle which has only a single or uniform temperature control, typically provided by a nozzle heater which heats the entire nozzle. This may lead to inaccurate or improperly molded parts because each of the various resins may not be at its optimum operating temperature during a particular molding operation. Also, the molding cycle time may have to be lengthened to allow for the different temperature requirements of the different melts. Further, the coinjection nozzle may have to be made larger to provide some minimal thermal separation between the different melt channels.

U.S. Pat. No. 4,717,324 to Schad discloses a coinjection hot runner system including a valve gated nozzle design having two melt channels, each located in different components forming the nozzle assembly. The patent discloses one method to maintain the two resins at different operating temperatures during their passage through the nozzle assembly from the nozzle's interface with the hot runner manifold to the gate to the mold cavity. In the '324 patent, the nozzle assembly comprises concentric components separated from each other by an air gap, for most of the nozzle's length. At the nozzle tip, however, an outer nozzle housing component locates and seals against the mold gate insert and consequently has poor thermal insulation at that interface. This allows substantial heat loss from the nozzle heater, and causes poor thermal management at the nozzle tip/gate interface.

U.S. Pat. No. 5,030,077 to Orimoto discloses a coinjection hot runner nozzle having concentric melt channels for the various resins, with the central channel having a movable tip that blocks a surrounding channel when resin flows through the central channel. Such a movable tip increase manufacturing and maintenance costs. There is no disclosure about how to thermally insulate the nozzle assembly from the mold cavity or its environs. Moreover, access to service the nozzle tip is complicated.

U.S. Pat. No. 5,897,822 to van Manen discloses a valve gated coinjection hot runner nozzle having a concentric melt channel for a single resin. The thermal insulation at the gate area is poor and the nozzle must be completely dismantled to service the tip and gate area.

U.S. Pat. No. 5,935,615 to Gellert discloses a coinjection hot runner nozzle having a concentric melt channel for one resin. Access to service the melt channels and tip is difficult.

U.S. Pat. No. 6,261,075 to Lee discloses a valve gated coinjection hot runner nozzle having separately drilled channels for two resins, on either side of the valve stem. Access to service the melt channels and tip is difficult. See also:

U.S. patent application Ser. No. 10/879,576 entitled INJECTION MOLDING MACHINE SHOOTING POT WITH INTEGRAL CHECK VALVE;

U.S. patent application Ser. No. 10/879,581 entitled INJECTION MOLDING MACHINE SPIGOTTED SHOOTING POT PISTON U.S. patent application Ser. No. 10/879,621 entitled APPARATUS AND METHOD FOR SEALING INJECTION UNIT AND SPRUE;

U.S. patent application Ser. No. 10/879,575 entitled APPARATUS AND METHOD FOR ACTUATION OF INJECTION MOLDING SHOOTING POTS;

U.S. patent application Ser. No. 10/879,582 entitled CONTROL SYSTEM FOR A DYNAMIC FEED COINJECTION PROCESS;

U.S. patent application Ser. No. 10/880,493 entitled COINJECTION MOLDING COOLED SHOOTING POT CYLINDER;

U.S. patent application Ser. No. 10/887,353 entitled APPARATUS AND METHOD FOR INJECTION MOLDING SHOOTING POT WEDGE FEATURE.

Thus, what is needed is a hot runner coinjection molding nozzle structure which allows melts with differing operating temperatures requirements to be processed through the same nozzle, allows close spacing of mold cavities, provides a removable tip with separate servicing of the different melt channels, provides a highly thermally conductive tip for efficient heat transfer, and is relatively inexpensive to design, install, and maintain.

SUMMARY OF THE INVENTION

It is an advantage of the present invention to overcome the problems of the related art and to provide a coinjection nozzle which efficiently injects melt with different operating temperatures, yet is easy to install and maintain.

According to a first aspect of the present invention, a novel combination of structure and/or steps are provided for a coinjection molding nozzle including a nozzle body having a longitudinal axis, a proximal end, and a distal end A first nozzle body melt channel is disposed in the nozzle body, has a proximal end and a distal end, and is configured to carry a first melt. A second nozzle body melt channel is disposed in the nozzle body substantially parallel to the first nozzle body melt channel, has a proximal end and a distal end, and is configured to carry a second melt. A thermally conductive nozzle tip is disposed at a distal end of the nozzle body. A first nozzle tip melt channel is disposed in the nozzle tip and is configured to carry the first melt from the first nozzle body melt channel. The first nozzle tip melt channel has a proximal end and a distal end. A second nozzle tip melt channel is disposed in the nozzle tip and is configured to carry the second melt from the second nozzle body melt channel. The second nozzle tip melt channel has a proximal end and a distal end, the distal end of the second nozzle tip melt channel merging into the distal end of the first nozzle tip melt channel.

According to a second aspect of the present invention, a novel combination of structure and/or steps are provided for a coinjection nozzle includes a nozzle body, and a nozzle tip removably coupleable to the nozzle body. The nozzle tip comprises a material which is more thermally conductive than the nozzle body. A first nozzle body melt channel is disposed in the nozzle body and is configured to carry a first melt to the nozzle tip. A second nozzle body melt channel is disposed in the nozzle body and is configured to carry a second melt to the nozzle tip at a same location as the first nozzle body melt channel. First and second thermal separation grooves are disposed in the nozzle body substantially parallel to and on opposite sides, respectively, of the second nozzle body melt channel.

According to a third aspect of the present invention, a novel combination of structure and/or steps are provided for an injection mold including a mold cavity, a first hot runner manifold configured to carry a first melt, and a second hot runner manifold configured to carry a second melt. A coinjection nozzle includes a nozzle body having a longitudinal axis, a proximal end, and a distal end. A first nozzle body melt channel is disposed in the nozzle body, has a proximal end and a distal end, and is configured to carry the first melt from the first hot runner manifold. A second nozzle body melt channel is disposed in the nozzle body substantially parallel to the first nozzle body melt channel, has a proximal end and a distal end, and is configured to carry the second melt from the second hot runner manifold. A thermally conductive nozzle tip is disposed at a distal end of the nozzle body. A first nozzle tip melt channel is disposed in the nozzle tip and is configured to carry the first melt from the first nozzle body melt channel to the mold cavity, the first nozzle tip melt channel having a proximal end and a distal end. A second nozzle tip melt channel is disposed in the nozzle tip and is configured to carry the second melt from the second nozzle body melt channel to the mold cavity, the second nozzle tip melt channel having a proximal end and a distal end. The distal end of the second nozzle tip melt channel merges into the distal end of the first nozzle tip melt channel.

According to a fourth aspect of the present invention, a novel combination of steps are provided for a method of coinjection molding, including the steps of: (i) injecting a first resin through a first nozzle melt channel in a coinjection nozzle having first and second nozzle melt channels which end at the same gate, and into a mold cavity; (ii) injecting a second resin through the second nozzle melt channel into the mold cavity; (iii) heating the first nozzle melt channel to a different temperature than the second nozzle melt channel; and (iv) keeping thermally separate the first and second nozzle melt channels.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. Introduction

The present invention will now be described with respect to several embodiments in which a plastic resin coinjection molding machine injects "A" and "C" resins through different coinjection nozzle melt channels into a mold cavity. The present invention may be used in coinjection nozzles which inject three or more melts through three or more different melt channels.

Briefly, the preferred embodiments of the present invention provide for at least one coinjection nozzle melt channel (which carries a second melt) to be thermally separated from a main melt channel (which carries a first melt) to the greatest extent possible, to provide for separate thermal control over the different melt channels.

2. The Structure of the First Embodiment

Figure 1:
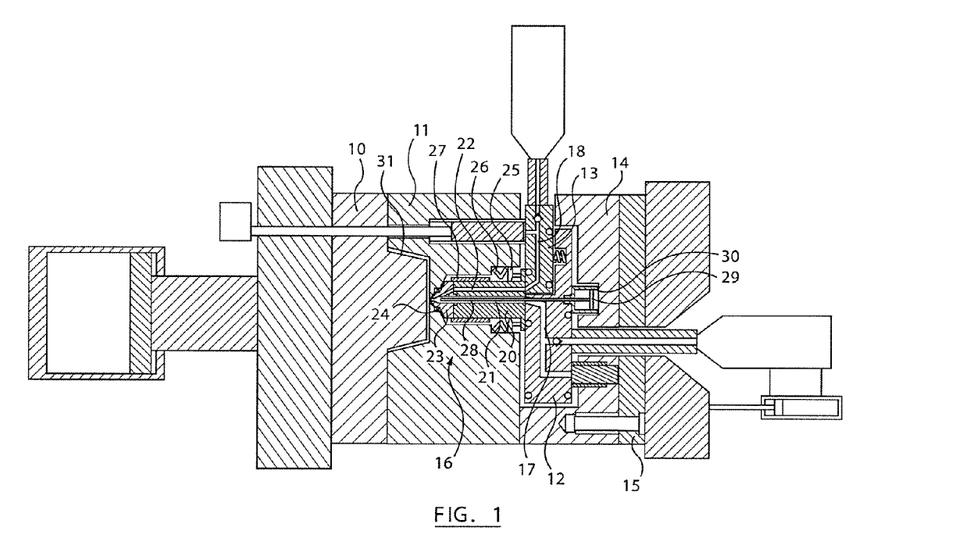
FIG. 1 is a schematic view of a coinjection hot runner mold including a nozzle assembly according to the preferred embodiment of the present invention.

FIG. 1 shows an overall section view of a coinjection hot runner mold with a valve gated nozzle assembly for conveying two plastic resins from their separate manifolds to the gate of the mold cavity. The mold includes a core block 10, a cavity block 11, a first hot runner manifold 12, a second hot runner manifold 13, a manifold plate 14, a manifold backing plate 15, and a nozzle assembly 16. The first manifold 12 has a first melt channel 17 connecting its source to the proximal end of the nozzle assembly 16. The second manifold 13 has a second melt channel 18 connecting its source to the proximal end of the nozzle assembly 16.

The nozzle assembly 16 comprises a nozzle body 20 containing two nozzle body melt channels 21 and 22, in which a first nozzle body melt channel 21 is aligned with the first melt channel 17 of the first manifold 12, and a second nozzle body melt channel 22 is aligned with the second melt channel 18 of the second manifold 13. The nozzle assembly 16 also comprises a nozzle tip 23, a nozzle tip insulator 24, a nozzle body insulator 25, a spring pack 26, a nozzle heater 27, and a valve stem 28 that is reciprocated by a valve gate stem piston 29 operated pneumatically by a cylinder 30 in known fashion. The nozzle tip 23 at the distal end of the nozzle assembly 16 is configured to inject first and second resins through a valve gate into a mold cavity 31.

Figure 2:
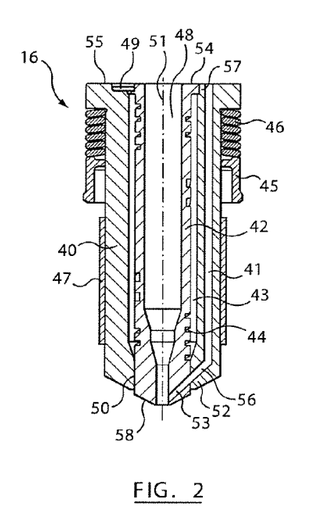
FIG. 2 is a schematic section view of a nozzle assembly according to a first embodiment of the present invention.

FIG. 2 shows in greater detail the structure of the first embodiment of the present invention. Therein, the nozzle assembly 16 comprises a nozzle body 40 that is heated by an external heater 47 attached to the outer surface of the nozzle body 40. The nozzle body 40 contains an inner nozzle 42 with a first nozzle body melt channel 48, and an outer, second nozzle body melt channel 41 which is substantially parallel to and coaxially spaced from the nozzle body 40 by an air space 43. Preferably, the first nozzle body melt channel 48 is about 11 mm in diameter, the second nozzle body melt channel 41 is about 3 mm in diameter and is spaced approximately 7 mm from the first nozzle body melt channel 48. Preferably, the air space 43 is shaped as an annulus, is 1,5 mm wide, and is respectively spaced from the first nozzle body melt channel 48 and the second nozzle body melt channel 41 by 7 mm and 1,5 mm.

Preferably, the second nozzle body melt channel 41 has an angled extension melt channel 56 extending to an inner nozzle tip melt channel 53 extending to the tip 58 of the nozzle 16. The inner nozzle 42 is preferably heated by a resistance type heater (not shown) disposed in spiral groove(s) 44 on the outer surface of the inner nozzle 42. The nozzle assembly 16 also includes a nozzle body insulator 45 and spring pack 46. The inner nozzle 42 is aligned within the nozzle body 40 by a head diameter 57 and a tip diameter 50, such that the inner nozzle 42 and the nozzle body 40 have coaxial centerlines 51. The inner nozzle tip diameter 50 is configured such that it seals within the nozzle body's bore 52 at the tip, so that the second resin being conveyed from the second nozzle body melt channel 41 and its extension 56 in the nozzle body 40 to the melt channel extension 53 in the inner nozzle tip 58 does not leak as it passes across the interface between the nozzle body 40 and the inner nozzle 42.

The nozzle body 40 and the inner nozzle 42 can be heated to separate temperatures by their individual heaters 47 and 44, respectively, so that the resins they convey can be maintained at their optimum (perhaps different) processing temperatures. The inner nozzle 42 is able to expand longitudinally within the nozzle body bore 52 and thereby allow its proximal end 54 to remain coplanar with the corresponding proximal end 55 of the nozzle body 40, thereby maintaining a flat interface for sealing with the manifolds 12 and 13. The melt channel extension 53 at the inner nozzle tip is configured to align with the melt channel extension 56 after the longitudinal thermal expansions of both the nozzle body 40 and the inner nozzle 42 have taken place and both components are at their operating temperatures for their respective resins (e.g., 280 degrees C. for a first resin such as PET, and 220 degrees C. for a second resin such as EVOH). The two components are preferably aligned radially by a dowel 49 pressed into inner nozzle 42 at its proximal end 54. Space is provided in the first melt channel 48 of the inner nozzle 42 to accommodate the valve stem 28 (not shown in FIG. 2). This design of nozzle assembly (an air gap between the separately-heated inner nozzle body and the nozzle body) provides good thermal separation between the components handling the different materials.

3. The Structure of the Second Embodiment

Figure 3:
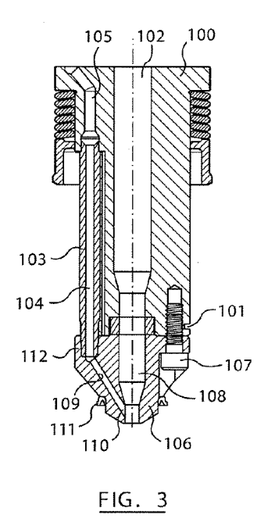
FIG. 3 is a schematic section view of a nozzle assembly according to a second embodiment of the present invention.
Figure 4:
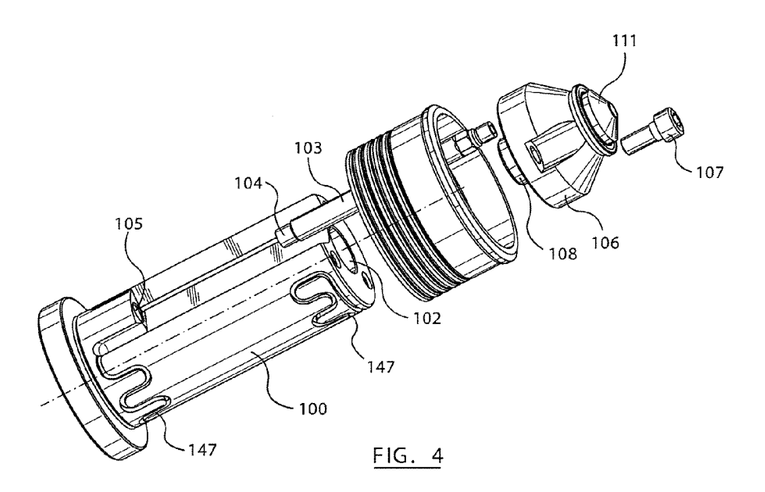
FIG. 4 is a perspective view of a nozzle assembly according to the FIG. 3 embodiment.

FIGS. 3 and 4 show a second embodiment of the nozzle assembly, comprising a nozzle body 100, heated by an external resistance heater(s) 147 in corresponding groove(s) 101, and containing a first nozzle body melt channel 102 and a second nozzle body melt channel 105. The heater(s) 147 are preferably only provided on the surface of the nozzle body 100 which is not adjacent to the second nozzle body melt channel 105 and a nozzle pipe 103, as shown in FIG. 4. The nozzle pipe 103, containing a nozzle melt pipe melt channel 104, is inserted into the upper end of the nozzle body 100 to extend the second nozzle body melt channel 105 externally alongside the outer surface of the nozzle body 100. The nozzle pipe melt channel 104 is thus thermally separated, by an air space, from the nozzle body 100. Preferably, the nozzle pipe 103 is 65 mm long, 6 mm in outside diameter, 3 mm in inside diameter, and is separated from the adjacent outer surface of the nozzle body 100 by 0,5 mm.

A nozzle tip 106, made from a highly thermally conductive material (such as a beryllium copper) is fastened to the end of the nozzle body 100 and the nozzle pipe 103 with a plurality of removable fasteners (such as bolts) 107, thereby allowing removal and servicing of the tip 106 while the mold is in the machine and without requiring dismantling of the hot runner system. The first nozzle body melt channel 102 in the nozzle body 100 is extended in the tip 106 as a first nozzle tip melt channel 108; and the nozzle pipe melt channel 104 is extended in the nozzle tip 106 as a second nozzle tip melt channel 109, eventually feeding into and merging with the first nozzle tip melt channel 108 near the distal end of the tip at 110. An insulator 111, made from a relatively thermally insulating material (such as titanium) is attached to the nozzle tip 106 to provide alignment and sealing at the gate installation.

The unheated nozzle pipe 103 allows that portion of the nozzle pipe melt channel 104 to provide a lower temperature environment than the first nozzle body melt channel 102 that is completely within the heated nozzle body 100. The differential longitudinal thermal expansion that will occur between the nozzle body 100 and the nozzle pipe 103 is accommodated in the configuration of the nozzle tip 106 by providing a generous engagement diameter 112 for sealing regardless of the operating position the nozzle pipe 103 occupies when the nozzle assembly is at operating temperature.

4. The Structure of the Third Embodiment

Figure 5:
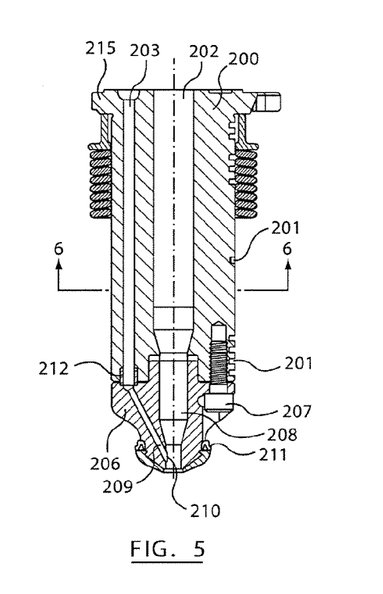
FIG. 5 is a schematic view of a nozzle assembly according to a third embodiment of the present invention.
Figure 6:
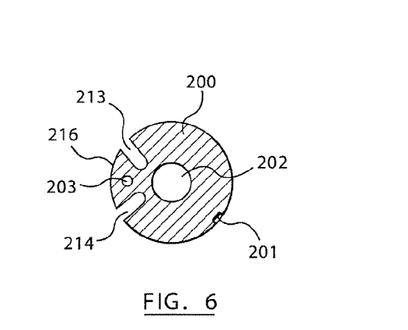
FIG. 6 is schematic view of the FIG. 5 embodiment, taken along line 6—6 FIG. 5.

FIGS. 5 and 6 show the third (currently, the most preferred) embodiment of the nozzle assembly, comprising a single body 200, heated by an external resistance heater(s) (not shown) in groove(s) 201 and containing a first melt channel 202 and a second melt channel 203. As with the second embodiment, the heater(s) are preferably only provided on the surface of the nozzle body 100 which is not adjacent to the second nozzle body melt channel 203, as shown in FIG. 5. FIG. 6 depicts a section view through section 6—6 in FIG. 5, and illustrates a first thermal separation/insulation groove 213 and a second thermal separation/insulation groove 214 cut or molded into the nozzle body 200. One or more of the grooves 213 and 214 extends substantially the entire length of the nozzle body 200, but preferably does not cut into, or through, the nozzle head portion 215.

The grooves 213 and 214 provide an effective thermal separation between the portions of the nozzle body containing the two melt channels 202 and 203 and substantially inhibit the amount of heat conducted to the second melt traveling in the second melt channel 203, thereby causing the two melts to be handled at differing temperatures. The external surface 216 of that portion of the nozzle body 200 containing the second melt channel 203 may be unheated whereas the remaining surface area of the nozzle body 200 is heated, for example by one or more resistance heaters disposed in the groove(s) 201, or by a film heater directly applied to the said surface. Preferably, the grooves 213 and 214 extend inward from an outer surface of the nozzle body a radial distance (or groove depth) of 9,5 mm which is more than half of the 18 mm radius of the nozzle body, as shown in FIG. 6. The deepest portions of the grooves 213 and 214 are thus closer to the first melt channel 202 than is the second melt channel 203. Preferably, the grooves 213 and 214 are each 70 mm long and substantially parallel to the longitudinal axis of the nozzle body 200. Also preferably, each of the grooves 213 and 214 has a width which is less than a diameter of the first nozzle body melt channel 202 but greater than a diameter of the second nozzle body melt channel 203. Of course, and configuration, size, shape, or dimensions of the grooves 213 and 214 may be used, depending on the particular injection application.

The nozzle tip 206 is preferably made from a thermally conductive material (such as a beryllium copper), and is fastened to the end of the nozzle body 200 with fasteners (such as bolts) 207. The melt channels 202 and 203 are respectively extended in the nozzle tip 106 as a first nozzle tip melt channel 208 and a second nozzle tip melt channel 209, with the channel 209 eventually feeding into the first nozzle tip channel 208 near the distal end of the nozzle tip at 210. An insulator 211 (made from a thermally insulating material such as titanium) is attached to the tip 206 to provide alignment and sealing at the gate installation. A tubular sealing dowel 212 rotationally aligns the nozzle tip 206 with the nozzle body 200 and aids in sealing the melt channel interface.

With this configuration (as compared to the FIGS. 3 and 4 embodiment), there are very few issues arising from the differential longitudinal thermal expansion of the melt channel bodies, and consequently the risk of leakage is greatly reduced or eliminated. The lack of thermal differentiation between the channels 202 and 203 (again as compared to the FIGS. 3 and 4 embodiment) is not significant in the case of the specific plastic resins being processed in the preferred plastic injection molding application. The ease of serviceability in the machine is maintained with the removable fasteners 207 securing the nozzle tip 206. Space is provided in the first nozzle melt channel 202 of the body 200 to accommodate the valve stem 28 (not shown in FIG. 5.

5. Conclusion

Advantageous features according to the present invention include:

A coinjection nozzle assembly having a separate highly conductive tip wherein both melt channels combine into a single channel and outlet fastened to the nozzle body by removable fasteners.

A coinjection nozzle body having at least two melt channels housed in portions the nozzle body thermally separated from an adjacent channel.

Thus, what has been described is a coinjection molding nozzle in which resins with different operating temperatures are injected trough nozzle melt channels which are controlled in thermally distinct ways.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patents and patent applications discussed above are hereby incorporated by reference into the Detiled Description of the Preferred Embodiments.

What is claimed is:

1. Coinjection molding nozzle, comprising:
   a nozzle body having a longitudinal axis, a proximal end, and a distal end;
   a first nozzle body melt channel disposed in said nozzle body, said first nozzle body melt channel having a proximal end and a distal end, and being configured to carry a first melt;
   a second nozzle body melt channel disposed in said nozzle body substantially parallel to said first nozzle body melt channel, said second nozzle body melt channel having a proximal end and a distal end, and being configured to carry a second melt;
   a thermally conductive nozzle tip disposed at a distal end of said nozzle body;
   a first nozzle tip melt channel disposed in said nozzle tip and configured to carry the first melt from said first nozzle body melt channel, said first nozzle tip melt channel having a proximal end and a distal end;
   a second nozzle tip melt channel disposed in said nozzle tip and configured to carry the second melt from said second nozzle body melt channel, said second nozzle tip melt channel having a proximal end and a distal end, the distal end of said second nozzle tip melt channel merging into the distal end of said first nozzle tip melt channel; and first and second thermal insulation grooves disposed in said nozzle body parallel to and on opposite sides of said second nozzle melt channel, and configured to thermally separate said second nozzle melt channel from said first nozzle melt channel.

2. A coinjection molding nozzle according to claim 1, further comprising coupling structure configured to removably couple said nozzle tip to said nozzle body.

3. A coinjection molding nozzle according to claim 1, wherein said first and second thermal insulation grooves extend inward from an outer surface of said nozzle body by a radial distance that is more than one half of a radius of said nozzle body.

4. A coinjection molding nozzle according to claim 1, wherein said first and second grooves extend inward from an outer surface of said nozzle body so as to be closer to said first nozzle melt channel than is said second nozzle melt channel.

5. A coinjection molding nozzle according to claim 1, further comprising heating structure configured to heat a portion of said nozzle body adjacent said first nozzle body melt channel but not a portion of said nozzle body adjacent said second nozzle body melt channel.

6. A coinjection molding nozzle according to claim 1, wherein the distal end of said second nozzle tip melt channel merging into the distal end of said first nozzle tip melt channel before said first nozzle tip melt channel emerges from a distal end of said nozzle tip.

7. A coinjection molding nozzle according to claim 1, wherein said nozzle body comprises an inner nozzle body and an outer nozzle body, wherein said first nozzle body melt channel is disposed in said inner nozzle body, and wherein said second nozzle body melt channel is disposed in said outer nozzle body, and further comprising air gap structure disposed between said inner nozzle body and said outer nozzle body and configured to thermally separate said second nozzle body melt channel from said first nozzle body melt channel.

8. A coinjection molding nozzle according to claim 7, further comprising heating structure disposed on an outer surface of said inner nozzle body but radially inside said air gap structure and configured to heat a portion of said nozzle body adjacent said first nozzle body melt channel but not a portion of said nozzle body adjacent said second nozzle body melt channel.

9. A coinjection molding nozzle according to claim 8, further comprising further heating structure disposed on an outer surface of said outer nozzle body and configured to heat a portion of said nozzle body adjacent said second nozzle body melt channel.

10. A coinjection molding nozzle according to claim 7, wherein said second nozzle tip melt channel is disposed in said inner nozzle body.

11. A coinjection molding nozzle according to claim 10, wherein said second nozzle body melt channel includes an extension configured to be in fluid communication with said second nozzle tip melt channel when said inner nozzle body and said outer nozzle body are at operating temperature.

12. A coinjection molding nozzle according to claim 1, further comprising a nozzle pipe having a proximal end, a distal end, and an outside surface, said nozzle pipe being connected to said nozzle body by said nozzle pipe proximal and distal ends, the outer surface of said nozzle pipe being configured to not contact said nozzle body.

13. A coinjection molding nozzle according to claim 12, further comprising a nozzle pipe melt channel disposed inside said nozzle pipe and configured to carry the second melt from said second nozzle body melt channel to said second nozzle tip melt channel.

14. A coinjection molding nozzle according to claim 13, further comprising engagement structure configured to movably couple said nozzle pipe melt channel to said second nozzle tip melt channel.

15. A coinjection molding nozzle according to claim 13, further comprising coupling structure configured to removably couple said nozzle tip to said nozzle body.

16. A coinjection molding nozzle according to claim 13, further comprising heating structure configured to heat a portion of said nozzle body adjacent said first nozzle body melt channel but not a portion of said nozzle body adjacent said second nozzle body melt channel.

17. A coinjection nozzle, comprising:
a nozzle body;
a nozzle tip removably coupleable to said nozzle body, said nozzle tip comprising a material which is more thermally conductive than said nozzle body;
a first nozzle body melt channel disposed in said nozzle body and configured to carry a first melt to said nozzle tip;
a second nozzle body melt channel disposed in said nozzle body and configured to carry a second melt to said nozzle tip at a same location as said first nozzle body melt channel; and
first and second thermal separation grooves disposed in said nozzle body substantially parallel to and on opposite sides, respectively, of said second nozzle body melt channel.

18. A coinjection nozzle according to claim 17, wherein said first and second thermal separation grooves extend inward from an outer surface of said nozzle body to respective locations which are closer to said first nozzle body melt channel than is said second nozzle body melt channel, and wherein said first and second thermal separation grooves are configured to thermally separate said first nozzle body melt channel from said second nozzle body melt channel.

19. A coinjection nozzle according to claim 17, further comprising:
a first nozzle tip melt channel disposed in said nozzle tip and configured to carry the first melt from said first nozzle body melt channel, said first nozzle tip melt channel having a proximal end and a distal end; and
a second nozzle tip melt channel disposed in said nozzle tip and configured to carry the second melt from said second nozzle body melt channel, said second nozzle tip melt channel having a proximal end and a distal end, the distal end of said second nozzle tip melt channel merging into the distal end of said first nozzle tip melt channel.

20. A coinjection nozzle according to claim 17, further comprising heating structure configured to heat a portion of said nozzle body adjacent said first nozzle body melt channel but not a portion of said nozzle body adjacent said second nozzle body melt channel.

21. A hot runner assembly, comprising:
a first hot runner manifold configured to carry a first melt;
a second hot runner manifold configured to carry a second melt;
a coinjection nozzle comprising:
a nozzle body;
a nozzle tip disposed at a distal end of said nozzle body, said nozzle tip comprising a material which is more thermally conductive than said nozzle body;
a first nozzle body melt channel disposed in said nozzle body and configured to carry the first melt from said first hot runner manifold to said nozzle tip;
a second nozzle body melt channel disposed in said nozzle body and configured to carry the second melt from said second hot runner manifold to said nozzle tip; and
first and second thermal separation grooves disposed in said nozzle body substantially parallel to and on opposite sides, respectively, of said second nozzle body melt channel, said first and second thermal separation grooves being configured to thermally separate said first nozzle body melt channel from said second nozzle body melt channel.

22. A hot runner assembly, comprising:
a first hot runner manifold configured to carry a first melt;
a second hot runner manifold configured to carry a second melt;
a coinjection nozzle comprising:
a nozzle body having a longitudinal axis, a proximal end, and a distal end;
a first nozzle body melt channel disposed in said nozzle body, said first nozzle body melt channel having a proximal end and a distal end, and being configured to carry the first melt from said first hot runner manifold;
a second nozzle body melt channel disposed in said nozzle body substantially parallel to said first nozzle body melt channel, said second nozzle body melt channel having a proximal end and a distal end, and being configured to carry the second melt from said second hot runner manifold;
a thermally conductive nozzle tip disposed at a distal end of said nozzle body;
a first nozzle tip melt channel disposed in said nozzle tip and configured to carry the first melt from said first nozzle body melt channel, said first nozzle tip melt channel having a proximal end and a distal end;
a second nozzle tip melt channel disposed in said nozzle tip and configured to carry the second melt from said second nozzle body melt channel, said second nozzle tip melt channel having a proximal end and a distal end, the distal end of said second nozzle tip melt channel merging into the distal end of said first nozzle tip melt channel; and
first and second thermal insulation grooves disposed in said nozzle body parallel to and on opposite sides of said second nozzle melt channel, and configured to thermally separate said second nozzle melt channel from said first nozzle melt channel.

23. An injection mold, comprising:
a mold cavity;
a first hot runner manifold configured to carry a first melt;
a second hot runner manifold configured to carry a second melt;
a coinjection nozzle comprising:
a nozzle body having a longitudinal axis, a proximal end, and a distal end;
a first nozzle body melt channel disposed in said nozzle body, said first nozzle body melt channel having a proximal end and a distal end, and being configured to carry the first melt from said first hot runner manifold;
a second nozzle body melt channel disposed in said nozzle body substantially parallel to said first nozzle body melt channel, said second nozzle body melt channel having a proximal end and a distal end, and being configured to carry the second melt from said second hot runner manifold;

a thermally conductive nozzle tip disposed at a distal end of said nozzle body;

a first nozzle tip melt channel disposed in said nozzle tip and configured to carry the first melt from said first nozzle body melt channel to said mold cavity, said first nozzle tip melt channel having a proximal end and a distal end;

a second nozzle tip melt channel disposed in said nozzle tip and configured to carry the second melt from said second nozzle body melt channel to said mold cavity, said second nozzle tip melt channel having a proximal end and a distal end, the distal end of said second nozzle tip melt channel merging into the distal end of said first nozzle tip melt channel and;

first and second thermal insulation grooves disposed in said nozzle body parallel to and on opposite sides of said second nozzle melt channel, and configured to thermally separate said second nozzle melt channel from said first nozzle melt channel.

24. Coinjection molding nozzle, comprising:

a nozzle body having a longitudinal axis, a proximal end, and a distal end;

a first nozzle body melt channel disposed in said nozzle body, said first nozzle body melt channel having a proximal end and a distal end, and being configured to carry a first melt;

a second nozzle body melt channel disposed in said nozzle body substantially parallel to said first nozzle body melt channel, said second nozzle body melt channel having a proximal end and a distal end, and being configured to carry a second melt;

a thermally conductive nozzle tip disposed at a distal end of said nozzle body;

a first nozzle tip melt channel disposed in said nozzle tip and configured to carry the first melt from said first nozzle body melt channel, said first nozzle tip melt channel having a proximal end and a distal end;

a second nozzle tip melt channel disposed in said nozzle tip and configured to carry the second melt from said second nozzle body melt channel, said second nozzle tip melt channel having a proximal end and a distal end, the distal end of said second nozzle tip melt channel merging into the distal end of said first nozzle tip melt channel;

a nozzle pipe having a proximal end, a distal end, and an outside surface, said nozzle pipe being connected to said nozzle body by said nozzle pipe proximal and distal ends, the outer surface of said nozzle pipe being configured to not contact said nozzle body; and a nozzle pipe melt channel disposed inside said nozzle pipe and configured to carry the second melt from said second nozzle body melt channel to said second nozzle tip melt channel.

25. A coinjection molding nozzle according to claim 24, further comprising engagement structure configured to movably couple said nozzle pipe melt channel to said second nozzle tip melt channel.

26. A coinjection molding nozzle according to claim 24, further comprising coupling structure configured to removably couple said nozzle tip to said nozzle body.

27. A coinjection molding nozzle according to claim 24, further comprising heating structure configured to heat a portion of said nozzle body adjacent said first nozzle body melt channel but not a portion of said nozzle body adjacent said second nozzle body melt channel.

* * * * *